Figure 1:
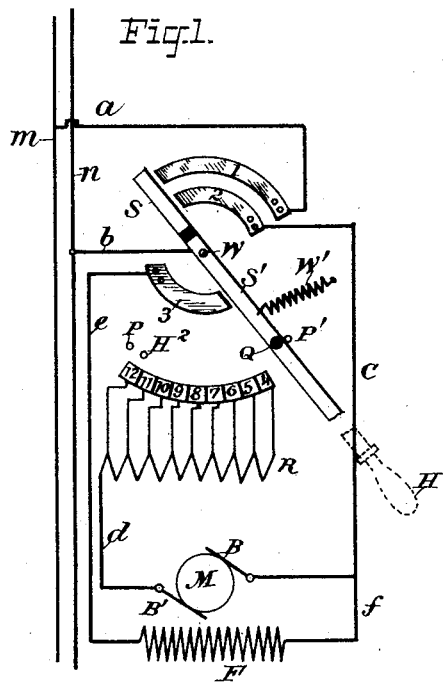

(No Model.)

E. W. RICE, Jr.
ELECTRIC MOTOR SWITCH.

No. 465,292. Patented Dec. 15, 1891.

ATTEST:
J. A. Hurdle
Wm. H. Capel.

INVENTOR:
Edwin Wilbur Rice Jr

By H. C. Townsend
Attorney

UNITED STATES PATENT OFFICE.

EDWIN WILBUR RICE, JR., OF LYNN, MASSACHUSETTS, ASSIGNOR TO THE THOMSON-HOUSTON ELECTRIC COMPANY, OF CONNECTICUT.

ELECTRIC-MOTOR SWITCH.

SPECIFICATION forming part of Letters Patent No. 465,292, dated December 15, 1891.

Application filed March 28, 1889. Serial No. 305,127. (No model.)

*To all whom it may concern:*

Be it known that I, EDWIN WILBUR RICE, Jr., a citizen of the United States, and a resident of Lynn, in the county of Essex and State of Massachusetts, have invented a certain new and useful Electric-Motor Switch, of which the following is a specification.

My invention relates to electric switches for electric apparatus, especially for electric motors operated from a constant-potential source, such as constant-potential mains.

The object of my invention is to prevent damage to the apparatus by reason of a sudden and large flow of current through the same, resulting in charring or burning of the insulation or other ill effects due to overheating.

It has been usual to employ in connection with electric motors operated from mains having a constant difference of potential two independent controlling devices, one consisting of what may be termed the "main switch," that throws the current onto the machine, and the other consisting of a resistance or rheostatic switch that is operated after the closure of circuit by the first and serves to gradually remove resistance from the circuit of the motor until the latter is brought up to its normal or working speed. The use of the rheostat is rendered necessary by reason of the fact that when the armature is stationary or moving at slow speed its counter electro-motive force is small, and the current will consequently pass through it from the main in greater amount than it will after the speed, and hence the counter electro-motive force has become normal. Hence the employment of the rheostat to prevent abnormal flow of current at the start. When the main and rheostatic switches are capable of being operated independently, there is danger that the attendant may stop the motor by opening the main switch and forget to throw back the rheostatic switch to its retracted position, where it will interpose a resistance to the flow of current through the armature. If now the motor should be started by closing the main switch, there will be an enormous and damaging flow of current through the motor, owing to the fact that there is little or no resistance in circuit and that the armature, being at rest, will generate no counter electro-motive force. It may also sometimes happen that through negligence or ignorance the attendant will throw the rheostatic switch forward first, cutting out the resistance, and then close the main switch, with the same damaging effects to the machine, fuses, or other connected parts.

My invention overcomes these difficulties; and it consists, essentially, in making the main and rheostatic switches interdependent in any proper way, so that one cannot be operated independently of the other in starting the motor, and that the main switch cannot be thrown back to stop the motor without retracting the rheostatic switch to the position where there will be a resistance in the circuit of the armature, and in adjusting or arranging the contacts of the switches with relation to one another and the mechanism in such way that the circuit of the field shall be established before the connection to the armature-circuit is made, thereby permitting the field magnetism to establish itself before current is allowed to flow through the armature. With this combination of switches and adjustment of the contacts, the current cannot be thrown onto the motor nor the circuit established with the armature excepting through a resistance and after the circuit of the field has been closed and the motor can only be brought up to its normal or working speed by withdrawing such resistance from circuit through the operation of the rheostatic switch. As the main switch controls the circuit to the shunt-field in the usual way, it is obvious that immediately on closing such switch the field will be excited, and then upon closure of the rheostatic switch the armature will begin to rotate through flow of current in its coils and to generate a counter electro-motive force. The connection of the two switches so that they cannot be operated independently can be made in any desired manner, provided the relation or order of action above defined be observed—to wit, that the rheostatic switch cannot be left in position with the resistance cut out when the main switch is turned to stop the motor, and that the closing of the rheostatic switch to interpose resistance in the armature-circuit can only take place after or as a consequence of the movement of the main switch to close the connections of the motor with the main. This order of action will obviously result in ordinary constructions from proper relative disposition of the connecting parts of the two switches.

My invention consists, further, in the combination, with an electric motor run from constant-potential mains, of connected or interdependent main and rheostatic switches and contacts, and connections whereby the armature-circuit is broken on both sides of the armature when the said switches are thrown to stop the motor.

My invention consists, further, in the combination, with an electric motor having its armature and field in separate branches and run from constant-potential mains, of interdependent main and rheostatic switches, the main switch having circuit making and breaking contacts connected to one side of the armature and field and the rheostatic switch having a contact and resistance connected to the opposite side of said armature.

My invention consists, further, in the combinations of devices hereinafter more particularly described, and specified in the claims.

Figure 2:
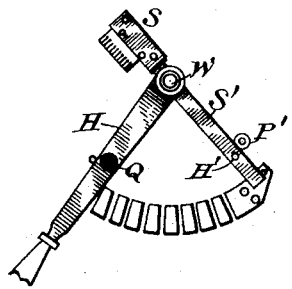

In Figure 1 of the accompanying drawings I have illustrated my invention diagrammatically in one of its forms, the parts of the switches being shown in plan. Fig. 2 shows in plan a preferred operating mechanism.

M is a motor-armature, and B B' the armature-brushes.

F is the usual derived-circuit field-magnet.

Mains of constant difference of potential are indicated at $m$ $n$.

S' is a switch-lever pivoted at W on a suitable base and adapted to move over the base between two stops P P'. Movement is communicated to the lever S' by a suitable handle H. The lever S', being thrown in one direction by the handle, may be thrown in the other by a spring W' on disengagement of the device for holding it. The lever S' may be held in one position against the action of the spring while the motor is in operation by means of a socket or hole $H^2$ on the switchboard, with which pin Q, passing through S', may engage, or may be held by any other suitable means.

The contacts or circuit-closing devices of the main switch consist on one side of the segmental plates 1 2, over which contact S, carried by lever S', but insulated therefrom, may slide, so as to close the circuit from 1 to 2, which latter are connected, respectively, by wire $a$ with main $m$ and by wires $c$ $f$ with one side of the armature and field. The other side of the field connects by wire $e$ with a contact-plate 3, over which the lever S' may be moved to close the connection with main $n$ through a wire $f$, connected to lever S'. The lever S' also makes the connection to main $n$ from brush B' of the motor by wire $d$ and resistance R. It will be observed that the connection of the armature on both sides with the mains may be broken.

The rheostatic switch consists of a series of contacts 4 to 12, connected to loops of an artificial resistance R of any kind and adapted to be engaged by a contact connected to the main $n$. The latter contact is carried by or is a part of the lever S', or is otherwise connected to or dependent upon the same in its action, so that when S' is moved back for opening the connections of the motor and its derived-circuit field with the mains through the main switch at 1 and 2 the contact of the rheostatic switch will be moved away from the position of little resistance. The contacts 1, 2, and 3 are so arranged with relation to the main-switch lever that when the said switch is opened the contact of the rheostatic switch will be in position opposite or near to the plate 4 of the resistance.

The operation is as follows: When it is desired to start the motor, the lever S' is moved toward the left. The connection of the armature and field with the main $m$ is thereby completed at one side of the armature through the bridging of the contacts 1 2 by the plate S, and about the same time the connection of the field branch $f$ $e$ with the other main line $n$ is completed by the connection of the main switch with its circuit making and breaking plate 3. These connections establish a circuit through the field-magnet; but the connection of the armature on one side only is made. The connection of the field-magnet thus may take place just before the connection of S' with the initial contact-plate 4 of the resistance R takes place, so as to complete the connection through the branch containing the armature; but on continuance of the movement after the establishment of the circuit through the field by the closure of the main-switch contacts 1 2 3 the lever S' will connect with the plate 4 of the resistance R, and the circuit will then be established through the armature of the motor, but with all of the resistance R in the circuit. The armature of the motor M now begins to rotate slowly, its speed gradually rising as the lever S' makes contact, respectively, with the plates 5 6 7, &c., until the last plate 12 of the resistance R is reached, when the full effect of the current is exerted in the armature of the motor and it attains its normal speed. As the circuit through the field branch is established before the connection to the motor is made at contact 4, it is obvious that the field magnetism may be established before the current is allowed to flow through the armature, and there will therefore be developed a counter electro-motive force in the armature at the moment the current is turned upon it, which will prevent injury to it from a sudden gush of current. The circuit established before the closure of contact 4 to complete the connection of both sides of the armature with the two mains $m$ $n$ is from $b$, by 3 $e$ F $c$ 2 S 1 $a$, to $m$. The lever, on reaching plate 12, may be held in position in any suitable way, as by a pin Q, forced into $a$ hole H. When the switch is moved back to the position shown, it is obvious that the armature-circuit will be broken on both sides of the armature, one break being established at the plates 1 2 and the other at plate 4. The return of the lever to this position for the purpose of stopping the motor may be by the connection of the spring W, which will act quickly and throw the switch into position against the stop P' when the pin Q is pulled out. As will be obvious, the movement backward of the main switches produces, necessarily, a movement of the parts of the rheostatic switch, carrying the latter back to position, where the first movement thereof will result in closing the armature-circuit through the greater part of the resistance.

It will be obvious that the rheostatic switch cannot be turned to the left to position to throw out the resistance without closing the main switch, so as to start the armature into rotation.

As an operating device I prefer to employ a separately-mounted handle-bar H, Fig. 2, adapted to engage with the lever S' by a spring-pin Q on H, which pin may enter a socket H' in S' or may be withdrawn therefrom when it is desired that the switch should be retracted by the spring W' for the purpose of stopping the motor. The pin Q might pass through the lever S' and enter the socket H², so as to hold the switch in proper position while the motor is running.

What I claim as my invention is—

1. The combination, with an electric motor on a constant-potential main, of a rheostatic switch and main switch, an independently-pivoted actuating-handle, and a retracting-spring for opening the main switch when the motor is to be thrown out of circuit.

2. The combination, with an electric motor fed from constant-potential mains, of switch-contacts and connections whereby the connection of the armature with both mains may be broken or closed at pleasure, a rheostat in a branch containing the armature, a rheostatic switch actuated with the main switch and moved into position to interpose resistance in the armature-circuit when the main switch is thrown to break the armature-circuit, a field-magnet in a branch independent of the armature, and a switch for making and breaking the circuit thereof mechanically connected with the said rheostatic and armature switch.

3. The combination, with an electric motor having its field and armature coils in separate circuits and supplied by a current from a source of approximately constant potential, of a switch for breaking and making the connection of the shunt field-magnet coils with the source of constant potential, and a rheostatic switch in the branch or circuit with the armature, said switches being interdependent when operated in a direction to start the motor and having contacts adjusted in the manner described to establish the field-magnet circuit before the armature-circuit is made.

4. The combination, with an electric motor fed from constant-potential mains and having armature and field-magnet coils in separate branches, of a main-circuit switch having two sets of circuit making and breaking contacts placed, respectively, in the connection between the two sides of the motor and the two mains, and a connected rheostatic switch controlling the branch containing the armature and having an initial circuit-closing contact adjusted or placed in position, as described, so that the armature-circuit may not be completed until after the circuit to the field-magnet is completed.

5. The combination, with an electric motor run from constant-potential mains and having its field and armature in separate branches, of connected and interdependent main and rheostatic switches controlling the circuit of said armature and field, and contacts and connections whereby the armature-circuit is broken on both sides of the armature when the said switches are thrown to stop the motor and the circuit to the field is completed before the armature-circuit is closed to start the motor.

6. The combination, with an electric motor having its armature and field in separate branches and run from constant-potential mains, of interdependent main and rheostatic switches, the main switch having circuit making and breaking contacts connected to one side of the armature and field and the rheostatic switch having a contact and resistance connected to the opposite side of said armature.

7. The combination, with an electric motor having its armature and field in separate branches and fed from constant-potential mains, of a main starting and stopping switch having contacts between both sides of the field-magnet and the mains, a connection from one side of the armature to the main through a main-switch contact or contacts, and a connection from the other side of the motor through a rheostatic switch the operation of which is dependent upon the operation of the main switch, as and for the purpose described.

Signed at Lynn, in the county of Essex and State of Massachusetts, this 25th day of March, A. D. 1889.

EDWIN WILBUR RICE, JR.

Witnesses:
J. W. GIBBONEY,
N. G. JOHNSON.